Oct. 21, 1969 W. R. CAPUTO 3,474,299

RELAY CIRCUIT FOR COMMUNICATION APPARATUS

Filed March 13, 1964

3 Sheets-Sheet 1

WITNESSES

Bernard R. Giegue

James F. Young

INVENTOR

William R. Caputo

BY C. L. Freedman

ATTORNEY

Oct. 21, 1969 W. R. CAPUTO 3,474,299

RELAY CIRCUIT FOR COMMUNICATION APPARATUS

Filed March 13, 1964 3 Sheets-Sheet 2

United States Patent Office 3,474,299
Patented Oct. 21, 1969

3,474,299
RELAY CIRCUIT FOR COMMUNICATION APPARATUS

William R. Caputo, Jersey City, N.J., assignor to Westinghouse Electric Corporation, Pittsburgh, Pa., a corporation of Pennsylvania Continuation-in-part of application Ser. No. 322,242, Nov. 7, 1962. This application Mar. 13, 1964, Ser. No. 351,729
Int. Cl. H01h 47/02
U.S. Cl. 317—155.5 8 Claims

ABSTRACT OF THE DISCLOSURE

Monitoring apparatus is disclosed for monitoring the integrity of a protective communication system for example for detecting burglars or fire. For monitoring the critical detectors which directly detect burglars or fire, and which are normally open and close on a critical condition, a double-coil relay and an open-circuit detecting relay are provided for each protected area. The three coils of these relays are so interconnected with the communication conductors between the protected areas and the attendant console that during standby, the ampere turns through the coils of the double-coil relay are balanced but on the occurrence of an abnormal condition or a short the ampere turns are unbalanced and the double-coil relay operates to indicate the condition. On the occurrence of an open circuit the open-circuit detection relay operates to provide an alternative circuit for detection and to indicate the open circuit.

The integrity of the conductors from the supervisory detectors, which detect faults in the supervisory equipment such as sprinklers is also monitored by a double-coil relay. In this case the coils are supplied in parallel through resistors in the protected areas and at the console. These resistors are shunted or disconnected on the occurrence of a short or open circuit and unbalance of the ampere turns through the coils.

This application is a continuation-in-part of application Ser. No. 322,242, filed Nov. 7, 1962, now Patent No. 3,305,850, for Supervisory Apparatus, granted Feb. 21, 1967, to John Suozzo et al., and assigned to Westinghouse Electric Corporation.

This invention relates to the art of communication and has particular relationships to communication for protective purposes; specifically to monitor a region such as a building or group of buildings for critical, usually undesirable, conditions such as fire or burglary. Communication or supervisory apparatus which serves this purpose includes a plurality of critical-condition detectors in the areas in which such conditions as fire or burglary are likely to occur and a plurality of supervisory detectors. The latter detect deficiencies in the supervisory apparatus as, for example, the fire extinguishing apparatus. The critical and supervisory detectors are connected through conductors to an area panel in the building or in the neighborhood. The intelligence of the conditions is communicated to, and processed in, this panel. The panel is connected to a console at a remote station which displays signals indicating the conditions in the areas and is monitored by an operator who can take corrective action. The conductors between the panel and the console may be telephone wires.

It is essential that the integrity and reliability of this communication apparatus be assured and it is a principal object of this invention to assure such integrity and reliability. It is also an object of this invention to provide communication apparatus including facilities for assuring integrity and reliability and method for operating such apparatus directed to the achievement of reliability and integrity.

The reliability of the apparatus depends not only on the reliability of the operation of the detectors but also on the reliability and integrity of the lines connecting the area panel to the detectors and the lines between the panel and the console and also on the condition of the supply conductors and other components at the panel and the console. Defects in the lines, for example a short-circuit or an open-circuit, would cause the communication apparatus to malfunction and to fail to respond properly to detection of a critical condition or other defect. In addition any grounding at the panel or at the console or between these components and the detectors could also cause malfunctioning.

It is an object of this invention to provide apparatus for monitoring the various conductors over which the inteligence of operation of detectors is communicated for open-circuits or short-circuits and for promptly and reliably indicating the existence of such conditions. Another object of this invention is to provide highly reliable apparatus for detecting grounding in an area panel or associated console and for promptly and reliably indicating that such grounding has occurred. It is a further object of this invention to provide apparatus which shall continuously monitor the conductors through which the detectors of critical conditions are connected to the panel and shall promptly and reliably indicate open-circuiting or short-circuiting of these conductors. Still another object of this invention is to provide apparatus for monitoring the conductors connecting the supervisory alarm detectors with the panel for short-circuits and open-circuits.

An incidental object of this invention is to provide a novel relay circuit particularly suitable for use in protective communication apparatus which shall operate highly reliably. Another incidental object of this invention is to provide a highly reliable relay circuit, including a relay having a pair of coils, which circuit shall be particularly suitable for use in protective communication apparatus for detecting critical conditions or defects in supervisory apparatus but may have other related uses. Still another incidental object of this invention is to provide a highly reliable and sensitive relay circuit, including a relay having a pair of coils, which shall be particularly suitable for use in communication apparatus for monitoring supervisory apparatus for critical-condition detection but shall have other related uses.

In accordance with this invention, apparatus is provided for monitoring the integrity of the conductors from the critical condition detectors to the area panel. These detectors are open in the nonalarming or uncritical condition. The apparatus includes an alarm relay having two coils; that is, a differential relay, for each protected region. Each pair of coils is supplied in a series network including an open-circuit detection relay and the conductors between the critical detectors and the area panel. The open-circuit detection relay is normally energized by the current flow through the coils. The ampere turns produced by the current through the coils of the two-coil relay counteract or counterbalance each other so that this relay is normally unactuated. On the appearance of an open-circuit in any of the conductors the open-circuit detection relay drops out providing an alternative circuit for the alarm relay and causing a signal to be actuated to indicate the alarm. On the occurrence of a short-circuit, or on operation of the detector, one of the coils of the alarm relay is shunted out by the short-circuit and because of the resulting unbalance in the ampere turns through the coils, the two-coil relay is actuated operating the alarm signals.

The supervisory detectors are normally closed. A short-circuit condition of the conductors from these detectors to the panels is then not detectable by the detection of a closed circuit across these conductors. In accordance with this invention a resistor is connected in series with each supervisory detector and the resistor and detector are connected across the conductors from the supervised apparatus to the area panel. A short-circuit across the conductors then cuts out the resistance and may be readily detected.

An alarm relay having two coils; that is, a differential relay, is provided for responding to the supervisory alarm. The supervisory alarm detector is in this case connected across the communication conductors to the area panel through the resistor. One of the coils of this relay is supplied with energizing current through the communication conductors and the resistor and detector. The other coil is supplied with energizing current through another resistor. The current flow through the two coils counterbalances so that the relay is normally unactuated. If the supervisory detector opens on the occurrence of a supervisory alarm or the conductors are open-circuited the current through the coil in series with the conductors is interrupted, the current continues to flow through the other coil and the relay operates. On the occurrence of a short-circuit the resistance in series with the supervisory detector is shunted out of the circuit and the coil in series with the conductors draws substantially higher current than the other coil so that the relay again operates. The differential effect here involved may be substantially increased, and the sensitivity of the apparatus may be substantially improved, by providing a relay in which the coil connected in series with the conductors has a substantially lower resistance than the other coil. In addition a resistor may be connected in series with both coils. The flow of additional current through this resistor by reason of a short-circuit decreases the flow of current through the unshorted coil and thus enhances the effect of the short-circuit.

In communication apparatus with which this invention is concerned the supply conductors in the area panel and the console float electrically. The detection of grounding is effected by connecting an auxiliary supply to one of the floating conductors so that if there is grounding of the other conductor through any part or through any of the components of the apparatus a potential is impressed across a ground-detection relay.

In accordance with an aspect of this invention, an auxiliary supply is connected to one of the floating conductors and is so poled as to provide a potential difference between any point of the protected system and ground. Thus on the occurrence of any grounding, a potential is available for operating a relay. Specifically, a relay may be connected between the auxiliary supply ground and any grounding would then complete the circuit through the auxiliary supply to operate the ground detecting relay.

The novel features considered characteristic of this invention are disclosed above. For a better understanding of this invention, both as to its organization and as to its method of operation, together with additional objects and advantages thereof, reference is made to the following description taken in connection with the accompanying drawings, in which.

Figure 2:
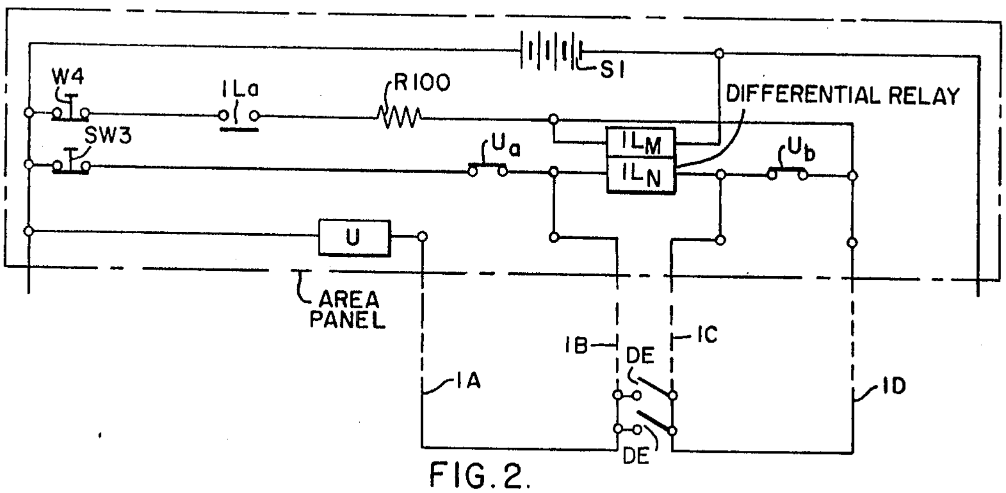
FIG. 2 is a schematic showing an embodiment of this invention for monitoring the integrity conductors between the critical-condition detectors and the area panel and also for detecting critical conditions.
Figure 3:
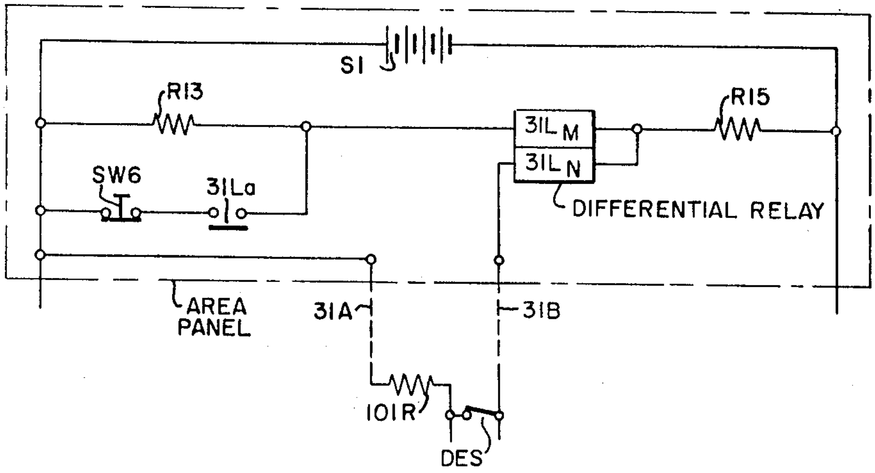
FIG. 3 is a schematic showing an embodiment of the invention for monitoring the integrity of the conductors between the supervisory detectors and the area panel and for detecting operation of supervisory detectors.
Figure 5:
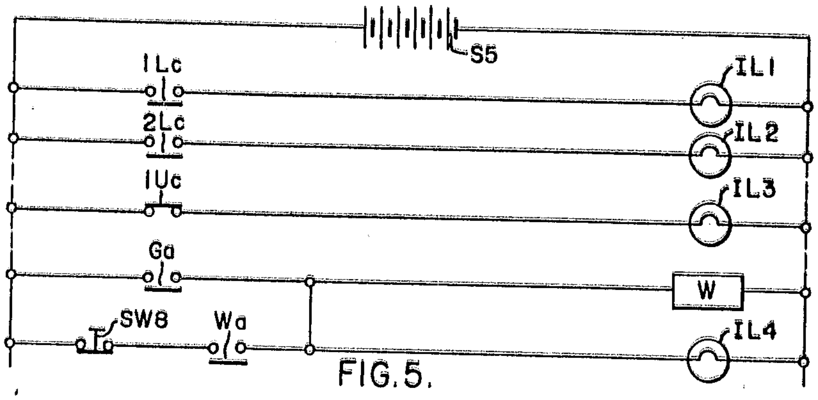
Figure 6:
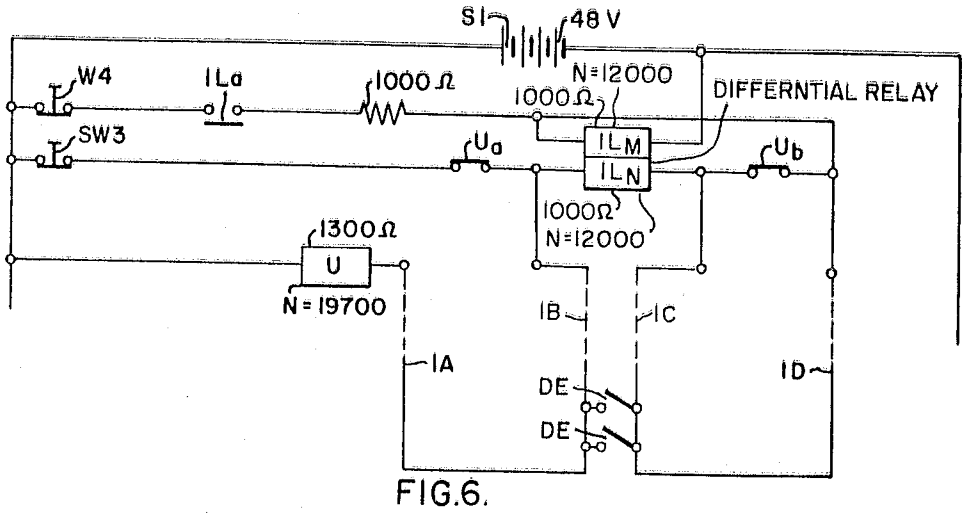
Figure 7:
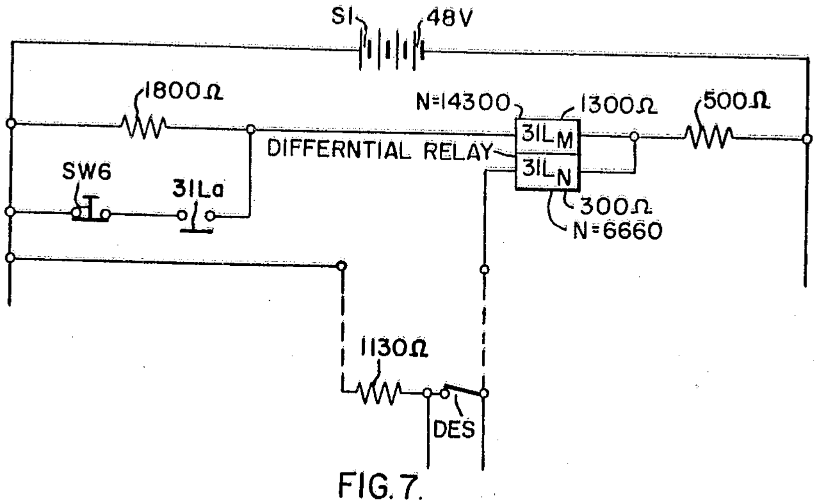

FIG. 5 is a schematic showing a part of the display indicating the alarms produced with the embodiments shown in FIGS. 2, 3 and 5; and FIGS. 6 and 7 are similar to FIGS. 2 and 3 but show the actual magnitudes of components included in apparatus which was found to operate satisfactorily.

FIGS. 6 and 7 are presented for the purpose of aiding those skilled in the art in practicing this invention and not with any intention of limiting the scope of this invention.

Figure 1:
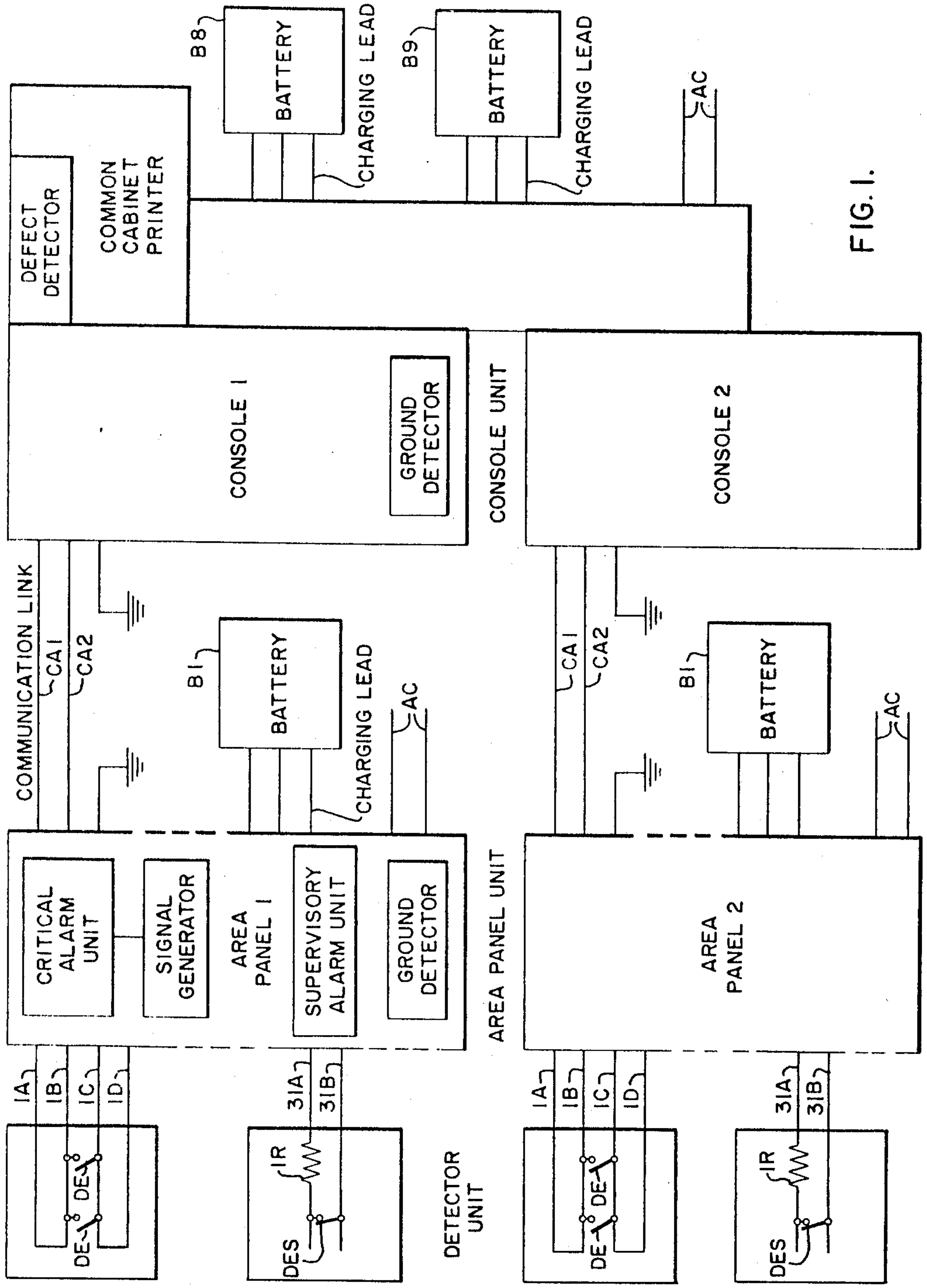
FIGURE 1 is a block diagram showing protective communication apparatus which embodies this invention and with which this invention may be practiced.

The apparatus shown in FIG. 1 is a communication system for monitoring for both critical alarms and for supervisory alarms. Critical conditions are monitored by normally open switch means or detectors DE. Abnormal supervisory conditions are monitored by normally closed switch means or detectors DES. The detectors DE and DES are distributed over the protected areas or regions and communicate with an Area Panel in which the intelligence received from the detectors DE and DES is processed. Typically, fifty detectors including the critical detectors DE and the supervisory detectors DES, may feed into one Area Panel. Typically, thirty detectors may be critical and twenty supervisory. A communication system may provide protection for a large region and may include a larger number of detectors DE and DES. Such a system includes a number of Area Panels connected to process intelligence from different groups of detectors DE and DES.

In FIG. 1, the Area Panels are designated AREA PANEL 1 and AREA PANEL 2. The critical condition detectors DE for each identifiable protected area (for example a small room) are connected to the Area Panel through conductors which are of substantial length since the critical detectors are at a remote position with respect to the Area Panel. Thus the detectors DE for one identifiable area are connected to the Area Panel through conductors 1A, 1B, 1C and 1D. Detectors DE for a second area would be connected to the Area Panel through like conductors 2A, 2B, 2C and 2D. Each supervisory detector DES for an identifiable area is connected through a resistor and two conductors to the Area Panel. The resistor is connected to the detector DES at the remote terminals of the conductors. In the case of one of the detectors DES, the conductors are labeled 31A and 31B. The detector DES is connected in series with resistor 1R to the conductors 31A and 31B which are in turn connected to the Area Panel. The labeling and the connections for AREA PANEL 2 are similar. Each Area Panel is supplied with power from a battery B1 and from a commercial alternating current supply.

Each Area Panel is connected to a Console on which the signals covering the intelligence from the detectors are displayed. The Console for AREA PANEL 1 is labeled CONSOLE 1 and for AREA PANEL 2, CONSOLE 2. The Consoles are supplied with power through batteries B8, B9 and also with power from a commercial alternating current supply. The Consoles are disposed in a central region remote from the Area Panels where they are monitored by operators. The consoles are connected to the associated Area Panels by communication link CA1 and CA2 which may be telephone lines. Components including a printer and related devices are common to all of the Consoles. This common apparatus is disposed in a common panel or cabinet which is labeled COMMON CABINET PRINTER in FIG. 1. Any relays which operate into the common cabinet from the different Consoles are labeled with the number 1 or the number 2 depending on the Console in which they are located. Thus the relay U located in CONSOLE 1 is labeled U–1, the relay U located in CONSOLE 2 is labeled U–2.

In the use of this apparatus an operator monitors the Consoles. On the occurrence of a critical condition or supervisory apparatus failure the corresponding detector DE closes or DES opens and the corresponding Area Panel is actuated to process this intelligence. An alarm signal indicating the condition or failure appears on the Console. This completes the alarm process. The operator must now act to restore normality. If he acts and is successful, the restoration to normality opens the involved detector DE or closes the involved detector DES and responsive to this change the system is reset.

Each Area Panel includes alarm units which respond to the operation of the detectors DE and DES. The units are of two types a Critical Alarm Unit and a Supervisory Alarm Unit.

Each set of Critical Alarm Units are supplied with intelligence through the conductors between the detectors and the Area Panel, one set being supplied by the conductors 1A, 1B, 1C and 1D and another set by 31A and 31B.

The Critical Alarm Unit of AREA PANEL 1 may include monitoring apparatus as shown in FIG. 2. The Supervisory Alarm Unit may be similar to that shown in FIG. 3. In addition each Area Panel and each Console includes a Ground Detector unit. Typical such units are shown in FIG. 5.

The relationship between the detectors DE and DES and such conductors as 1A, 1B, 1C and 1D, and 31A and 31B, the Area Panel, the Console and the other parts of the apparatus and their cooperation in detecting critical alarms and supervisory alarms and providing indications of such alarms is disclosed in detail in Patent 3,305,850. The present application is confined only to monitoring.

The apparatus shown in FIG. 2 includes an alarm relay 1L having two coils $1L_N$ and $1L_M$. Such a relay is associated with the critical condition detectors DE of each identifiable area. The coils $1L_N$ and $1L_M$ have a substantially equal number of turns and substantially equal resistance. The relay 1L has a lock-in contact 1L*a* and additional contacts which perform the functions disclosed in Patent 3,305,850 in cooperation with other related relays in the Area Panel.

The apparatus shown in FIG. 2 also includes an open-circuit detecting relay U. Such a relay is associated with each critical alarm relay; that is, with each identifiable area. The relay U has contacts $U_a$ and $U_b$ associated with the relay L and additional contacts, for example $IU_c$ FIG. 5 and others (not shown) which cooperate in the Area Panel as disclosed in Patent 3,305,850. The relays 1L and U are supplied from the power supply S1 of the Area Panel. This power supply is illustrated as a battery in FIG. 2 but in the actual practice of this invention may be a rectifier connected to a commercial alternating current supply.

The coils $1L_N$ and $1L_M$ are connected in series with coil of U through the conductors 1A, 1B, 1C, 1D from the critical detectors DE in the protected regions. The coils $1L_N$ and $1L_M$ are also adapted to be connected across the supply S1 through back contacts $U_a$ and $U_b$, in circuit: S1, SW3, $U_a$, $1L_N$, $U_b$, $1L_M$, S1. The coil $1L_M$ is also connected across the supply S1 through an automatic-cancel switch SW4, contact 1L*a* and a resistor R100. This is a lock-in circuit for the relay 1L.

When the protective system is set into operation, the armature of the relay U is moved so that contacts $U_a$ and $U_b$ are opened. Coils $1L_N$ and $1L_M$ are then energized in the following circuit: S1, U, 1A, 1B, $1L_N$, 1C, 1D, $1L_M$. The relay U is actuated and monitors the integrity of the conductors 1A, 1B, 1C and 1D. If there is an open-circuit in any of the conductors, the relay U is deenergized. In this event, coils $1L_N$ and $1L_M$ remain energized through $U_a$ and $U_b$ and the system continues to operate. But a contact (not shown) of relay U produces a signal to indicate the open-circuit.

The ampere turns through coils $1L_N$ and $1L_M$ in energizing circuit through U and the alternative energizing circuit through $U_a$ and $U_b$ counterbalance each other so that when energized in either circuit, relay 1L remains unactuated and contact 1L*a* remains open. In the event of a short-circuit, for example, a short-circuit of conductor 1A to 1C or 1D, or 1B to 1C or 1D or the closing of a detector DE, the coil $1L_N$ is shunted out and the current through $1L_M$ increases. In this case, the ampere turns through $1L_N$ are interrupted and relay L is actuated and locks itself in through 1L*a*. Relay L has contacts (for example 1L*c* FIG. 5 and others not shown) in the Area Panel which initiate the processing of an alarm signal indicating the short-circuit or the alarm.

The apparatus shown in FIG. 3 is essentially similar to the supervisory alarm apparatus incorporated in Patent 3,305,850. This apparatus includes a relay 31L having two coils $31L_M$ and $31L_N$. $31L_N$ has about half the number of turns of $31L_M$ and a resistance which is about one-fifth of the resistance of $31L_M$. The relay 31L is supplied from a supply S1 which may be the same supply as is included in the FIG. 2 apparatus since such apparatus usually has alarm relays both for critical condition detectors DE and for supervisory detectors DES. The coil $31L_M$ is supplied from S1 through resistors R13 and R15; the coil $31L_N$ is supplied from supply S1 through the conductors 31A and 31B, the supervisory detector DES and the resistor 101R and the resistor R15.

Under normal conditions, the ampere turns through $31L_M$ and $31L_N$ are counterbalanced so that the relay 31L is unactuated. In this case, the lock-in contact 31L*a* is open. If one of the conductors 31A or 31B becomes open-circuited or the supervisory alarm detector DES is opened, the current through $31L_N$ is interrupted, the relay 31L then has ampere turns only through $31L_M$ and is actuated and is locked in through 31L*a* and automatic cancel switch SW6. Under these circumstances, the appropriate apparatus in the Area Panel is actuated by contacts (not shown) of relay 31L as disclosed in Patent 3,305,850.

On the occurrence of a short-circuit across conductors 31A and 31B, coil $31L_N$ draws substantial current and the drop across resistor R15 is increased so that the current through $31L_M$ is substantially reduced. Under these circumstances, the ampere turns fo $31L_M$ and $31L_N$ are unbalanced and relay 31L is actuated. Lock-in contact 31L*a* closes but this has no effect on relay 31L. The ampere turns through $31L_N$ continue substantially higher than the ampere turns through $31L_M$ produced by the closing of the contact 31L*a* and the relay remains actuated until the short-circuit is interrupted.

Figure 4:
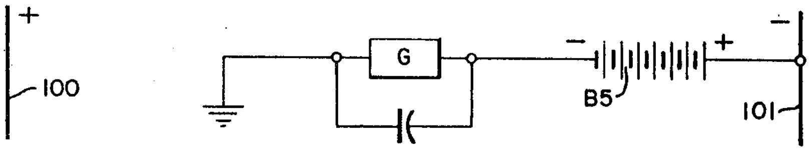
FIG. 4 is a schematic showing another embodiment of this invention for detecting grounding.

The apparatus shown in FIG. 4 is incorporated in Patent 3,305,850. This apparatus is supplied from power supply conductors 100 and 101 both of which float electrically with respect to ground. Conductor 100 is electrically positive and conductor 101 electrically negative. The apparatus shown in FIG. 4 includes an auxiliary battery B5 and a relay G. The positive pole of the battery B5 is connected to the negative terminal 101; the negative pole of the battery B5 is then the most negative point of the system. The coil of relay G is connected between ground and the negative terminal of the battery. On the occurrence of any grounding between conductors 100 and 101, the circuit through the battery B5 and the coil of the relay G is completed and the relay G is actuated to indicate the presence of grounding.

The apparatus shown in FIG. 5 is a portion of a display which would be included in the Area Panel of apparatus such as is shown in Patent 3,305,850. This display would aid service personnel in detecting defects. This apparatus would be included in the several Consoles and in the COMMON CABINET PRINTER. The display includes indicator lights IL1, IL2, IL3, IL4.

The light IL1 is adapted to be connected to the power supply S5 through the front contact 1L*c* of the relay 1L in the AREA PANEL 1. The indicator IL2 is similarly adapted to be connected to the power supply S5 through contact 2L*c*. Like lights are provided for the other alarm relays L. Operation of 1L in any Area Panel causes the corresponding indicator light IL to be displayed. An open-circuit in the conductors from the critical-condition detectors DE to the Area Panel is indicated by the extinction indicator IL3 which is energized through back contact 1U*c*.

The grounding relay G for the Area Panel has a front contact G*a*. The coil of relay W is adapted to the connected to supply S5 through G1*a*. When this contact is closed because of grounding, relay W is energized and locked in through reset switch SW8 and contact W*a*. In addition, ground indicator IL4 is energized.

I claim as my invention:

1. A protective relay circuit including a first relay having a pair of coils, a second relay having a coil and contacts, a power supply, a first energizing circuit for said first relay including said supply, said coil of said second relay and said coils of said first relay, the ampere turns through said coils of said first relay in said first circuit substantially counterbalancing so that said first relay is unactuated, a second energizing circuit for said first relay including said supply, said contacts and said coils of said first relay, the ampere turns through said coils of said first relay in said second circuit substantially counterbalancing so that said first relay is unactuated, and short-circuiting means connected to one of said coils of said first relay operable to actuate said first relay.

2. Communication apparatus including first, second and third conductors for transmitting information, a power supply, a first relay having a first coil and a second coil, a second relay having a coil and at least one back contact, means connecting in a first series circuit said power supply, said contacts, said first coil and said second coil, means connecting in a second series circuit, said power supply, said coil of said second relay, said conductors, said first coil and said second coil, said first coil being connected in said second circuit between said second conductor and said third conductor, the ampere turns through said first and second coils in said first and second circuits substantially counterbalancing so that said first relay is unactuated, and means connected to said second and third conductors for connecting said second and third conductors to actuate said relay.

3. Communication apparatus including a plurality of conductors for transmitting intelligence, a relay having a first coil and a second coil, power-supply means, means connecting, in a series-current-supply network, said power-supply means, said conductors in succession, said first coil and said second coil, the ampere turns through said coils counterbalancing so that said relay is unactuated so long as said conductors are intact, means responsive to a short-circuit of said conductors, for reducing the ampere turns through one of said coils to actuate said relay, and means, responsive to an open-circuit of at least one of said conductors, for closing an alternative circuit through said coils in which said ampere turns continue balanced.

4. Communication apparatus including conductors for transmitting intelligence, a power supply, a first relay having two coils, a second relay having a coil and back contacts, means connecting in a first series circuit said power supply, said contacts, and said coils of said first relay, the ampere turns through said coils of said first relay substantially counterbalancing in said first circuit so that said first relay is unactuated, and means connecting in a second series circuit, said supply, said coil of said second relay, said conductors and said coils of said first relay, the ampere turns through said coils of said first relay in said second circuit being substantially counterbalancing so that said first relay is unactuated, one of said coils of said first relay being connected to said conductors so that energizing current flows in sequence through one of said conductors, said one coil, and said other conductor, so that short-circuiting of said one and other conductors reduces the ampere turns through said one of said coils of said first relay to unbalanced magnitude actuating said first relay.

5. Communication apparatus comprising a pair of communicating stations spaced a substantial distance from each other, conductors between said stations for transmitting intelligence between said stations, a relay at one of said stations having a first coil and a second coil, first voltage-absorbing means, second voltage-absorbing means, at least a part of said second means being at said other station, power-supply means, a first circuit connecting said power-supply means in current-supply relationship with said first coil through said first voltage-absorbing means, a second circuit connecting said power-supply means in current supply relationship with said second coil through said second voltage-absorbing means and said conductors, the ampere turns through said first and second coils counterbalancing and said relay being unactuated so long as said circuits are intact, said part of said second voltage-absorbing means having a magnitude such that short-circuiting of said conductors unbalances the ampere turns through said first and second coils and actuates said relay, contact means at said other station in said second circuit, when opened, opening the circuit through said second coil and actuating said relay, and actuable means connected to said relay actuable on actuation of said relay.

6. The apparatus of claim 5 in which the second coil has a substantially lower resistance than the first coil and cooperates with the second voltage-absorbing means to assure positive actuation of the relay on short-circuiting of the conductors.

7. Apparatus for detecting an abnormal condition in an area comprising a detector operable to detect said abnormal condition, an alarm relay remote from said detector and having a pair of coil means, a monitor relay having coil means and contact means, wires for connecting said detector and said pair of coil means, power-supply means, means, responsive to actuation of said detector on the occurrence of an abnormal condition, connecting said power-supply means, said detector, said wires and one of said pair of coil means of said alarm relay in a main-alarm circuit through which current is conducted to energize said one coil means of said alarm relay to actuate said alarm relay, the path of said current excluding said contact means, a monitor circuit including said coil of said monitor relay, said power supply means, said other of said pair of coil means, and said wires to monitor the electrical continuity of said wires, said coil of said monitor relay and said other coil means being energized so long as said wires are electrically continuous, said other coil means and said one coil means being energized in balanced relationship to suppress actuation of said alarm relay so long as said condition is normal, and means responsive to electrical discontinuity of said wires to deenergize said coil of said monitor relay and said other coil means to actuate said monitor relay, to connect said coil of said alarm relay in an alternative alarm circuit including said contact means and to energize said one coil means and actuate said alarm relay.

8. Communication apparatus including at least a pair of conductors for transmitting intelligence, a relay having two coils, an energizing supply for said relay, and means connecting said supply, said conductors and said coils in a series energizing circuit in which said coils are connected with their ampere turns substantially counterbalancing each other so that said relay is unactuated so long as both coils conduct ampere turns, one of said coils being connected in said circuit to said conductors so that energizing current flows in sequence through one conductor, said one coil only, and said other conductor so that connection of one of said conductors to another of said conductors reduces the ampere turns through said one coil to unbalanced magnitude with reference to the ampere turns through the other coil actuating said relay and means connected to said conductors, responsive to an open-circuit in one of said conductors for connecting said supply and said coils in series in an alternative energizing circuit in which both coils conduct substantially equal ampere turns and the relay remains unactuated.

References Cited

UNITED STATES PATENTS

| | | | |
|---|---|---|---|
| 2,569,338 | 9/1951 | Richmond. | |
| 2,594,771 | 4/1952 | Hladky et al. | 340—213 |
| 2,684,475 | 7/1954 | Lode | 340—255 |
| 2,768,347 | 10/1956 | Hansen | 317—153 |
| 2,800,646 | 7/1957 | Lanham | 340—213 |
| 2,840,802 | 6/1958 | Derr et al. | 340—213 |
| 2,989,694 | 6/1961 | Fath et al. | 340—255 |
| 3,021,398 | 2/1962 | Barnett et al. | 340—213 |
| 3,176,283 | 3/1965 | Shanahan | 340—213 |
| 3,212,078 | 10/1965 | Shanahan | 340—213 |
| 3,010,068 | 11/1961 | Ferguson. | |
| 3,156,849 | 11/1964 | Epstein | 317—27 |

JOHN W. CALDWELL, Primary Examiner

DANIEL K. MYER, Assistant Examiner

U.S. Cl. X.R.

340—415